United States Patent [19]

Schatz

[11] Patent Number: 4,817,386
[45] Date of Patent: Apr. 4, 1989

[54] METHOD FOR THE SUPPLY OF COMBUSTION AIR TO THE COMBUSTION CHAMBER OF AN INTERNAL COMBUSTION ENGINE

[76] Inventor: Oskar Schatz, Tellhohe 14, D-8031 Stockdorf, Fed. Rep. of Germany

[21] Appl. No.: 948,456

[22] Filed: Dec. 29, 1986

Related U.S. Application Data

[63] Continuation of Ser. No. 609,930, May 14, 1984, abandoned.

[30] Foreign Application Priority Data

May 18, 1983 [DE] Fed. Rep. of Germany ....... 3318161

[51] Int. Cl.$^4$ ............................................. F02B 37/00
[52] U.S. Cl. ..................................... 60/605.1; 123/316
[58] Field of Search ................. 60/600, 601, 605, 611; 123/559, 564, 560, 316

[56] References Cited

U.S. PATENT DOCUMENTS

| | | | |
|---|---|---|---|
| 1,636,937 | 7/1927 | Hult | 123/560 X |
| 2,391,163 | 12/1945 | Jessup . | |
| 2,670,595 | 3/1954 | Miller | 60/611 X |
| 2,780,912 | 2/1957 | Miller | 60/611 |
| 2,851,851 | 9/1958 | Smith | 60/605 |
| 2,936,575 | 5/1960 | Lieberherr | 60/611 |
| 2,989,840 | 6/1961 | Lieberherr | 60/611 |
| 3,029,594 | 4/1962 | Miller | 60/605 |
| 3,336,911 | 8/1967 | Steiger | 123/563 |
| 4,211,082 | 7/1980 | Bristol | 60/605 |
| 4,426,985 | 1/1984 | Kanesaka | 60/611 X |

FOREIGN PATENT DOCUMENTS

| | | | |
|---|---|---|---|
| 781987 | 3/1935 | France | 60/605 |
| 1397178 | 3/1965 | France . | |
| 2461809 | 2/1981 | France . | |
| 225527 | 7/1925 | United Kingdom . | |
| 638923 | 6/1950 | United Kingdom | 60/605 |
| 815494 | 6/1959 | United Kingdom | 60/605 |
| 1024846 | 4/1966 | United Kingdom . | |
| 1093430 | 12/1967 | United Kingdom . | |

Primary Examiner—Michael Koczo
Attorney, Agent, or Firm—Harness, Dickey & Pierce

[57] ABSTRACT

An apparatus for supplying precompressed combustion air to an internal combustion engine. The engine having at least one piston including a piston cylinder, a piston positioned in the cylinder, and inlet and outlet ports in the cylinder. The apparatus includes a supercharger for compressing the combustion air which is transported, via a conduit, to the piston cylinder; a cooling element associated with the conduit for expanding and cooling the combustion air before the combustion air enters the cylinder; and a controller associated with the charger for controlling the volume of combustion air entering the piston cylinder. Also, disclosed is a method for supplying combustion air to a combustion chamber of an internal combustion engine.

2 Claims, 3 Drawing Sheets

METHOD FOR THE SUPPLY OF COMBUSTION AIR TO THE COMBUSTION CHAMBER OF AN INTERNAL COMBUSTION ENGINE

This is a continuation of U.S. patent application Ser. No. 609,930, filed May 14, 1984, now abandoned.

The invention relates to a method for the supply of combustion air into the combustion chamber of an internal combustion engine, more specially of a piston engine, with precompression of the combustion air before closure of the inlet valve.

Conventional charging methods for internal combustion engines using compressors are undertaken in such a way that the charging or filling pressure in the combustion chamber is increased to a value greater than that of the atmosphere, something that is practically only done in the case of so-called supercharging, in which compressed air flows from a storing means into the combustion chamber as long as the air inlet is open during the suction stroke.

The increase in the suction pressure known as supercharging so that the air has a pressure greater than the atmospheric pressure is an efficient method for increasing mileage and for lowering the amount of emission of exhaust gas into the atmosphere in traffic. Increasing mileage and decreasing emission of noxious substances is a currently relevant problem and calls for great efforts on the part of the automotive industry, more specially as regards improving engines and the corresponding adaption of transmissions thereto. On the other hand an obstacle in the way of greater use of supercharged vehicle engines is the fact that the product costs tied thereto are high and the development of corresponding engines is a slow and expensive process. For this reason the proportion of non-supercharged engines in the overall production is still quite high, although with such engines the amount of exhaust gas energy escaping into the atmosphere in most conditions of operation is higher than the useful work performed. When running under part load conditions, four stroke gasoline engines have a lower mileage than diesel engines, because the regulation of power is done by throttling the combustion so that the engine has to perform additional work for suction.

All in all it may be said that the fuel consumption of vehicle engines, more specially of non-supercharged ones, is overly high and that a large part of the energy consumed is lost into the atmosphere. In the case of a four stroke gasoline engine additional energy is lost when it is not fully loaded; developments in connection with regulation of power by modifying the timing of air inlet during the suction stroke have been excessively complex and so far have failed because of the high costs. Because of the increased charging pressure supercharging is responsible for a heavier mechanical loading of the engine, that for this reason has to be made with a stronger design able to withstand such loads so that the costs are correspondingly greater.

The object of the invention is to produce an increase in performance, more specially in the case of four stroke gasoline engines without increasing the charging pressure above the atmospheric pressure so that for this reason the normal unreinforced design of a non-supercharged engine may be used while nevertheless enhancing performance.

In keeping the invention this purpose is effected inasfar as the combustion air is expanded after compression, as at the beginning of the compression by the piston of the engine the air takes on the atmospheric pressure and as the combustion air is cooled, before the expansion, by a cooling means.

The expansion and the use of the cooling means cause the charged air to be cooled, i.e. the temperature level is lowered before combustion with an increase in performance. The increase in performance may be produced because of the enhanced knock limit. However it is also possible for the compression ratio to be increased so that the mileage is stepped up, more specifically when the engine is running under less than full load conditions.

In the way it is possible to increase the performance of a four stroke gasoline engine by an amount in the order to 30 to 40%, that is to say including the increase in performance due to the scavenging, made possible by the operation of the charger, of the burned gas from the cylinder of the engine.

The expansion may then take place in a device performing work or by shortening the filling phase of the engine cylinder.

If the filling phase is shortened the timing of the engine valves must be changed, for example by using another cam shaft so that the inlet is closed even before bottom dead cent (BDC). Furthermore it is necessary for a charger to be fitted. However, when looked at in the light of the benefits that may be obtained, such changes will be seen to be of a comparatively minor character, because they may be undertaken on a pre-existing engine design and do not involve any redesigning of the internal combustion engine.

Preferably the cooling may be undertaken in a way dependent on the operating characteristics of the engine.

The invention further relates to an internal combustion engine that may be operated using the method of the invention, and more specially to a piston engine, with a variable-volume combustion chamber and a charger, that is placed upstream from a valved inlet for the combustion air or the combustion air-fuel mixture.

In order to carry out the method it is possible for the expansion of the combustion air to take place upstream from the inlet into the combustion chamber or in the combustion chamber, for which reason a first working example of the internal combustion engine of the invention is so designed that there is cooling means placed between the charger and the inlet to the combustion chamber, and downstream from the charger there is an expansion device.

In keeping with a second working example of the internal combustion engine of the invention, a cooling means is placed between the charger and the inlet to the combustion chamber, and the inlet opening angle is constant and the beginning of inlet may be adjusted by a controller. In this respect, a particularly useful feature of the invention is that in the case of the use of a belt drive between the engine output shaft and a cam shaft controlling the inlet, the ratio between the slack and driving lengths of belt may be varied, this offering a simple way of varying the beginning of inlet while keeping the inlet opening angle constant.

The shortening of the inlet phase offers the additional useful effect that it is then possible for energy (i.e. energy capable of doing work) from the exhaust gas to be transmitted to the crankshaft by way of the increased charging or filling pressure through expansion in the engine cylinder.

In the first working example of the internal combustion engine the expansion means may be in the form of a charging chamber so that the work produced by the expansion is suppled to the charger or an expansion means may be used which transfers the work to the output shaft of the engine.

A more detailed account will now be given of the invention using the following account of the working examples to be seen in the drawings.

Figure 1:
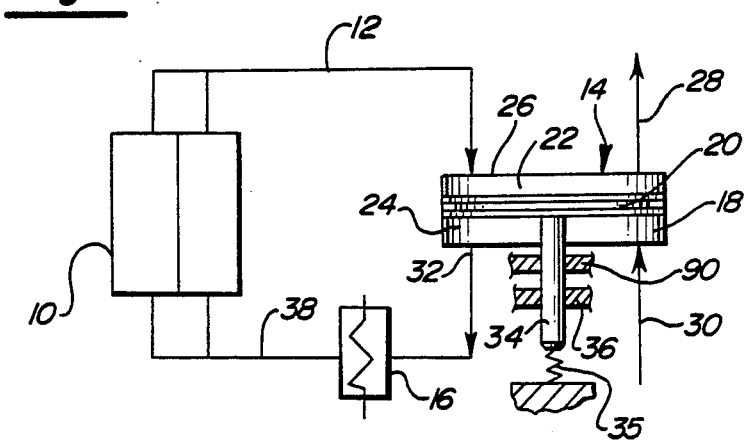
FIG. 1 is a diagrammatic representation of a first design of an internal combustion engine for carrying out the method.

A two-cylinder engine generally referenced 10 to be seen in FIG. 1 is fitted with a displacement charger 14 operated by the exhaust gases discharging through an exhaust gas duct 14 and with a cooler 16 in the form of a heat exchanger for the charged air. A moving partition 20 is placed in a charging chamber 18 in the charger 14, said partition dividing the charging chamber 18 into an exhaust gas chamber 22 and a charging air chamber 24. The exhaust chamber 22 has an exhaust gas inlet 26 that is joined with the exhaust gas duct 12, and an exhaust gas outlet 28. The charging air chamber 24 has a charging air inlet 30 and and charging air outlet 32, both of which may be fitted with check valves.

The partition 20 is fitted with a guide shank 34, that is slidingly supported outside the charging chamber 18 in a guide 36 so that the sealing means and the guiding means of the partition 20 are separate from each other and the losses through friction may be kept at a particularly low value. Moreover this system makes lubrication and servicing simpler.

The charging air outlet 32 is joined by way of a duct 38 with the inlets of the engine cylinders. In this duct 38 the cooler 16 is placed so that the air, that is compressed and therefore heated in the charger 14, is cooled before moving into the respective cylinder of the engine that is to be charged.

The volume of the charging air chamber 24 of the charger 14 is of such a size that the air requirement of one engine cylinder may be satisfied by the stroke of one charging chamber.

In the working example of FIG. 1 the inlet timing of the engine is such that the cylinder inlet is closed ahead of time, while the piston of the engine is still moving in the suction stroke. The outcome of this is that the compressed and already cooled charged air expands as far as the BDC of the engine piston and so cools down further. The arrangement is so designed in this respect that the final pressure in the cylinder before the beginning of the compression is generally equal to atmospheric pressure. The work performed by the expansion is transmitted to the piston and from same to the engine crankshaft.

Figure 2:
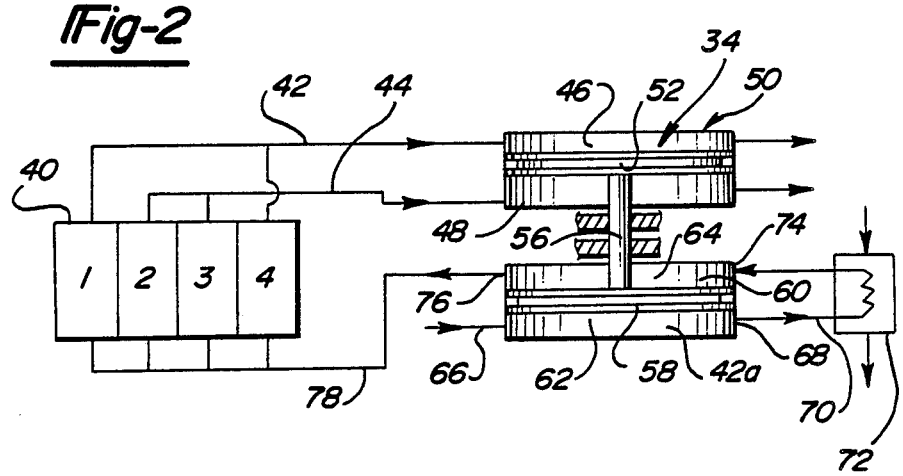
FIG. 2 is a diagrammatic representation of a second design of the internal combustion engine.

FIG. 2 shows a modified form of the design in which the expansion of the compressed charging air takes place outside the engine cylinder. FIG. 2 shows a four cylinder engine 40. Because the exhaust gas pulses due to four cylinders may cancel each other out to such a degree that the inertia of the partition of the charger may be no longer overcome, in this case the outlets of the cylinders 1 and 4 are combined to form one exhaust gas duct 42 and the outlets of the cylinders of the 2 and 3 are combined to form one exhaust gas duct 44, each exhaust duct 42 and 44 running to a separate exhaust gas chamber 46 or 48 of a displacement charger 50. These exhaust gas chambers 46 and 48 are positioned on either side of a moving partition 52 in a first charger chamber 54. The partition 52 is firmly ganged with a second partition 58 by way of a guide rod 56 so that the two move together, the partition 58 being mounted in a second charging chamber 60 and dividing it into a charging air chamber 62 and an expansion chamber 64. The charging air chamber 62 is fitted with a charging air inlet 66 and a charging air outlet 68, that are both fitted with check valves. A duct 70 runs from the charging air outlet 68 via a cooler 72 in the form of a heat exchanger to the inlet 74 of the expansion chamber 64. From the outlet 76 of same there runs a further duct 78 to the inlets of the four cylinders 1 to 4 of the engine 40.

In this arrangement the partition 52 is moved upwards and downwards by pulses of the exhaust gas produced alternately in the exhaust gas chambers 46 and 48. The partition 58 takes part in such motion as well, same making possible filling of the charging air chamber 62 with charging air, compressing same on the downward stroke and pumping it via the cooler 72 to the expansion chamber 64. The already cooled air expands in the expansion chamber 64 and thereby performs work which supports the compressing operation of the charger 50. The cooled and expanded air then makes its way through the duct 78 to the engine 40, whose cylinders are then filled with air as in a suction phase, such air having expanded till it reaches atmospheric pressure. The expansion chamber 64 is best fitted with means for controlling the air inlet and the air outlet.

Figure 3:
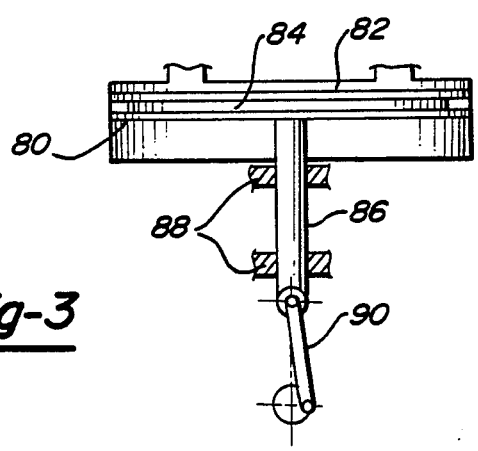
FIG. 3 is a view of a modified form of the design of FIG. 2 with an expansion means.

In place of the expansion chamber 64 integrated in the charger 50, it is furthermore possible to have a separate expansion chamber to be seen in FIG. 3, which is designed with an expansion means referenced 80. The expansion means 80 has a moving partition 84 in an expansion chamber 82, such partition having a guide rod 86, that is guided in a guide 88 for lengthways sliding motion and is joined to a pitman 90, that has its other end joined to the crankshaft of the engine so that expansion work may be directly transferred to the crankshaft. The expansion chamber 82 is best fitted with means for controlling the air inlet and air outlet.

Figure 4:
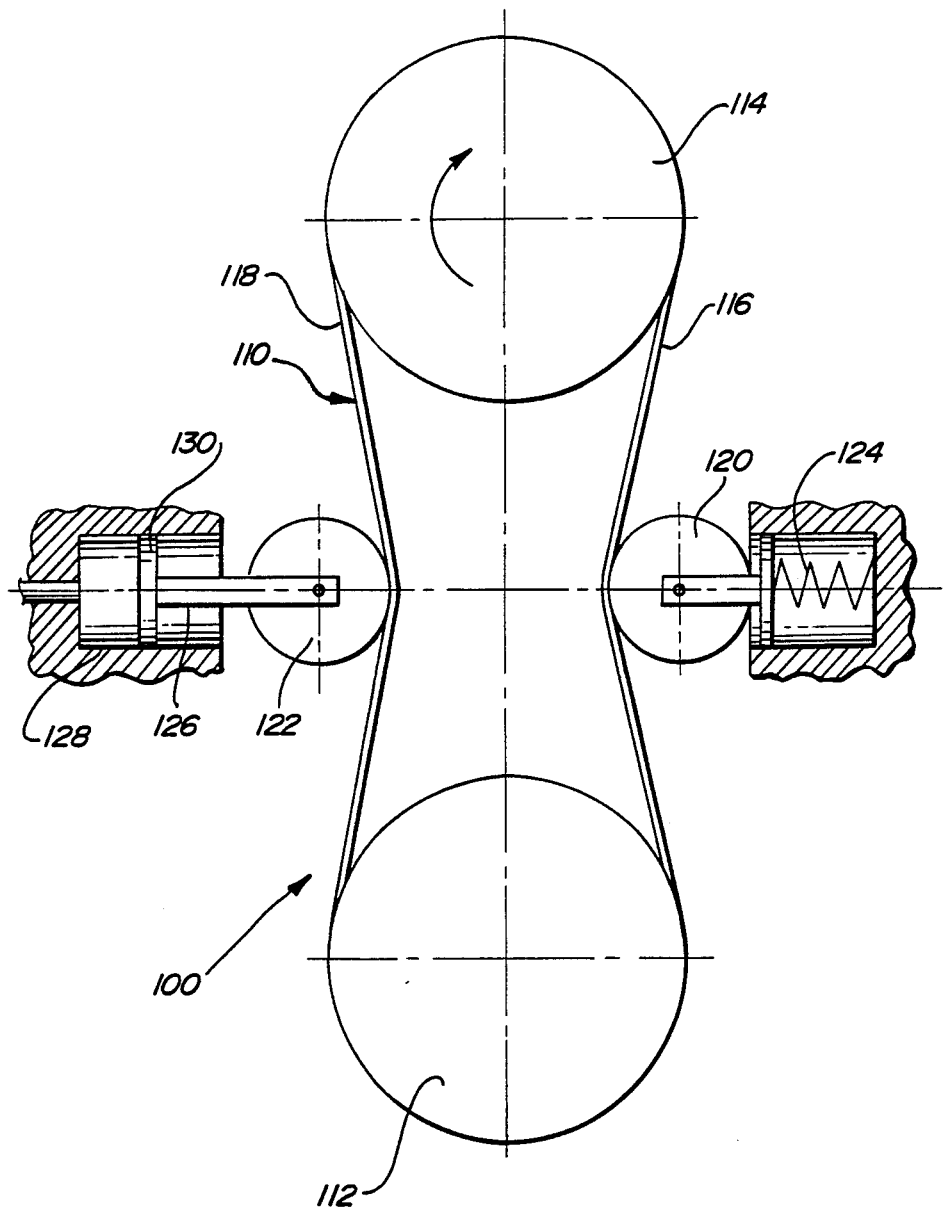
FIG. 4 is a diagrammatic side view of a first working example of a belt drive between the engine output shaft and the cam shaft.
Figure 5:
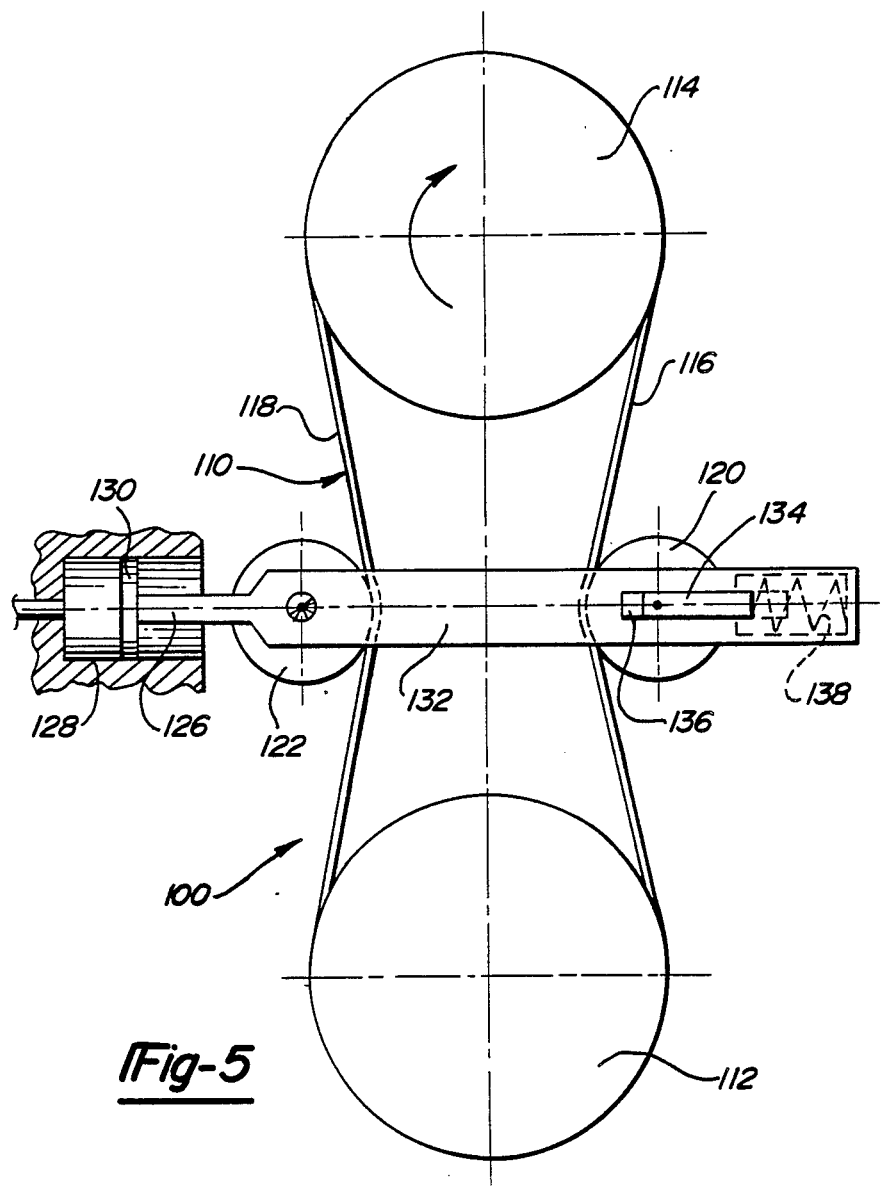
FIG. 5 is a view of second working example of the belt drive.

In order to adapt the amount of air pumped into the engine cylinders to the instantaneous requirement in keeping with running conditions, the inlet phase of the engine is varied while the opening angle is kept constant. FIGS. 4 and 5 show more specially useful designs for varying the phase relation between the engine crankshaft and the cam shaft using a belt drive 100. In this respect it is assumed that the engine is fitted with inlet valves, that are worked by a cam shaft driven by way of a belt drive from the output shaft of the engine.

In FIG. 4 a toothed belt 110 runs over four pulleys in all, namely a driving pulley 114 on the output shaft of the engine, a driven pulley 112 for driving the cam shaft and two further pulleys, i.e. a moving pulley 120 placed between the pulley 112 and the pulley 114, and furthermore a pulley 122 that may be adjusted in a direction across the direction of belt motion. The pulley 122—as will be seen from the later account—is used to control the phase relation between the engine output shaft and the cam shaft. As will be seen the pulley 120 is on the return run 116 of the belt and the pulley 122 is on the driving run 118 of the belt 110. This arrangement is an efficient one because the pulley 120 is pressed by a spring 124 against the belt 110 in order to keep up the desired belt tension. Because it is possible for the pulley 120 to move somewhat transversely in relation to the direction of the motion of the belt without same being caused by an adjustment of the pulley 122, the placing of the pulley 120 on the driving run would make possible small uncontrolled changes in length of the driving run and for this reason a departure from absolutely regular running of the driving pulley 114 and of the driving pulley 112.

On the other hand the pulley 122 may be exactly adjusted in its position normal to the direction of running of the belt 110. In the example shown this is made possible because the pulley 122 is bearinged on a piston rod 126, that is joined with the piston 130 sliding in a piston 128, such piston being able to be acted upon on both sides hydraulically, i.e. the cylinder 128 with the piston 130 is a double acting hydraulic actuator which may be used for exact adjustment of the position of the pulley 122. Hydraulic operation makes possible a simple regulation of the phase of the belt drive as a function of externally ascertained parameters, namely the operating data of the motor vehicle and of its internal combustion engine, when the belt drive is used for valve operation of the engine in keeping with the example noted in the introduction hereof.

If the pulley 122 is moved to the right in terms of FIG. 4, the driving belt run 118 becomes longer, whereas the return run 116 is representatively shortened so that the driven pulley has a lead over the driving pulley. If the pulley 122 is moved in the opposite direction, the driving belt run 118 will gradually move into its shortest, straightened out position, which is best such as to represent a lag or retard of the driven pulley 122 in relation to the driving pulley 114, whereas the phase shift of zero should be roughly in the middle between these two positions of the pulley 122, if the possibility both of a lead or advance and of a lag or retard is desired. In the case of both working examples the arrangement is such that in the one end position of the adjustable pulley 122 the one belt run 116 or 118 runs in a straightened out condition and the respective other belt run 118 or 116 will then have its maximum deflection out of the straightened out position. Keeping to this stipulation, variations in the placing of the pulleys 120 and 122 are possible. For example, in FIG. 4 the pulley 120 might be placed on the other side of the belt, although then the belt run 116 would have to pressed thereby not to the left but to the right out of the straight position. In the arrangement of FIG. 4 the spring 124 has to compensate the adjustment motion of the pulley 122. In the case of the working example of FIG. 5 this is not necessary so that here one may have a smaller, stiffer spring.

In the working example of FIG. 5 the piston rod 126 is joined to a bearing element 132, in which the pulley 122 is bearinged so that the motion of the pulley is limited to a rotary one. The pulley 120 is supported in a slide 134, that may be shifted to a limited degree in the bearing element 132 transversely in relation to the direction of the belt 110, to which end there may be guide slots 136 for mounting the slide 134. The slide 134 is supported on the bearing element 132 by way of a spring 138. This spring functions generally to keep up the tension of the belt 110 at the desired level.

If the piston 130 is moved, the pulleys 120 and 122 are moved as well. Since the two pulleys 120 and 122 make contact with the same face of the belt 110, the one belt run 116 is lengthened by roughly the same amount as the amount by which the other belt run 118 is shortened and the other way round. Slight departures in this respect, that occur on leaving the symmetrical position of the two lengths 116 and 118, may be allowed for by the spring 138.

The manner of operation would be the same if the two pulleys 120 and 122 were to be placed on different sides to the belt respectively, it only being necessary in this case to adopt the arrangement as described at the end of the account of FIG. 4. If one keeps to this condition, i.e. that in the one end position the one belt run is straightened and the other it is deflected to the maximum degree, it would be possible, getting the same useful effects as regards the size of the spring 138, for the pulley 120 also to be mounted with the help of the slide 134 in a bearing element which would be driven in the opposite direction to the piston rod 126 and the pulley 122 bearing thereon, even although this arrangement would seem to be of lesser utility because of the more complex mechanical design. However it will make it clear that the teaching of the invention may be put into practice in a number of very different ways and is not limited to the examples explained herein.

To be able to adjust the belt tension, it is preferred for the force of the spring 124 or 138 to be adjustable, as is known in connection with belt drives.

What is claimed:

1. A method for supplying combustion air to a combustion chamber of an internal combustion engine, said engine being a piston engine having means for compressing the combustion air, conduits connecting the compressing means to each piston cylinder of the engine, and cooling means associated with the conduits, said method comprising the steps of;

providing means for compressing combustion air, said means for compressing coupled with exhaust gas discharge of said engine, driving said means for compressing with exhaust gas pulses from the engine, compressing the combustion air in said means for compressing in response to exhaust gas pulses discharged from the engine, said means for compressing combustion air being of a desired size and having a desired volume such that a stroke of said means for compressing combustion air provides a piston cylinder of the engine with a desired amount of combustion air, transporting said combustion air along said conduit to said piston cylinder, passing said conduit through said cooling means, cooling said combustion air while passing said combustion air through said cooling means, expanding said combustion air in said piston cylinder before closing the inlet valve of said piston cylinder, closing said inlet valve during the piston suction stroke, providing said piston cylinder with a desired size and volume for enabling said expanded combustion air to expand in said cylinder and to have a pressure of substantially atmospheric pressure, and beginning a compression stroke by the engine with said expanded combustion air in said piston cylinder at a pressure at the beginning of said compression stroke of substantially atmospheric pressure.

2. The method of claim 1 wherein said closing occurs before the piston reaches bottom dead center of its stroke.

* * * * *

UNITED STATES PATENT AND TRADEMARK OFFICE
CERTIFICATE OF CORRECTION

PATENT NO. : 4,817,386
DATED : April 4, 1989
INVENTOR(S) : Oskar Schatz

It is certified that error appears in the above-identified patent and that said Letters Patent is hereby corrected as shown below:

Column 2, line 26, "cent" should read --center

Column 3, line 4, "suppled" should read --supplied--.

Column 3, line 33, delete "and" (second occurrence)

Column 5, line 50, after "to" insert --be--.

Signed and Sealed this

Eleventh Day of September, 1990

*Attest:*

HARRY F. MANBECK, JR.

*Attesting Officer*   *Commissioner of Patents and Trademarks*